United States Patent
Fritz et al.

(10) Patent No.: US 8,888,402 B2
(45) Date of Patent: Nov. 18, 2014

(54) SELF-PROPELLED CIVIL ENGINEERING MACHINE AND METHOD OF CONTROLLING A SELF-PROPELLED CIVIL ENGINEERING MACHINE

(71) Applicant: Wirtgen GmbH, Windhagen (DE)

(72) Inventors: Matthias Fritz, Linz/Rhein (DE); Cyrus Barimani, Königswinter (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 14/087,988

(22) Filed: Nov. 22, 2013

(65) Prior Publication Data

US 2014/0081532 A1 Mar. 20, 2014

Related U.S. Application Data

(63) Continuation of application No. 13/769,436, filed on Feb. 18, 2013, now Pat. No. 8,613,566, which is a continuation of application No. 12/970,221, filed on Dec. 16, 2010, now Pat. No. 8,388,263.

(30) Foreign Application Priority Data

Dec. 18, 2009 (DE) .......................... 10 2009 059 106

(51) Int. Cl.
*E01C 19/00* (2006.01)
*E01C 23/088* (2006.01)
*E01C 19/48* (2006.01)
*B62D 6/00* (2006.01)
*G05D 1/02* (2006.01)
*E01C 23/12* (2006.01)

(52) U.S. Cl.
CPC .............. *G05D 1/021* (2013.01); *E01C 23/088* (2013.01); *E01C 19/48* (2013.01); *B62D 6/002* (2013.01); *E01C 19/004* (2013.01); *E01C 23/127* (2013.01)

USPC ....................................... 404/84.2; 404/84.05

(58) Field of Classification Search
CPC ...... E01C 19/004; E01C 19/48; E01C 23/088; E01C 23/127; B62D 6/002; G05D 1/021
USPC ................................................ 404/84.05–84
See application file for complete search history.

(56) References Cited

U.S. PATENT DOCUMENTS 5,288,167 A 2/1994 Gaffard et al.
5,519,620 A 5/1996 Talbot et al.
(Continued)

FOREIGN PATENT DOCUMENTS

DE 19750315 A1 5/1998
DE 29918747 U1 2/2000
(Continued)

OTHER PUBLICATIONS

European Search Report in corresponding European Patent Application EP 10015261, dated Jun. 24, 2013, 6 pp. (not prior art).

*Primary Examiner* — Raymond W Addie
(74) *Attorney, Agent, or Firm* — Waddey & Patterson, P.C.; Lucian Wayne Beavers (57) ABSTRACT

The invention relates to a self-propelled civil engineering machine, and in particular to a slipform paver, road paver or road milling machine, and to a method of controlling a self-propelled civil engineering machine. The civil engineering machine according to the invention has a control unit which is configured to determine data which defines the position and/or orientation of a reference point on the civil engineering machine in relation to a reference system (X, Y, Z) independent of the position and orientation of the civil engineering machine. The reference system (X, Y, Z) independent of the machine-related reference system (x, y, z) may be selected as desired, and there is thus no need for the positions of various reference points to be plotted on the ground.

34 Claims, 8 Drawing Sheets

(56) References Cited

U.S. PATENT DOCUMENTS

| | | |
|---|---|---|
| 5,549,412 A | 8/1996 | Malone |
| 5,612,864 A | 3/1997 | Henderson |
| 5,631,658 A | 5/1997 | Gudat et al. |
| 5,838,277 A | 11/1998 | Loomis et al. |
| 5,929,807 A | 7/1999 | Viney et al. |
| 6,027,282 A | 2/2000 | Horn |
| 6,047,227 A | 4/2000 | Henderson et al. |
| 6,074,693 A | 6/2000 | Manning |
| 6,088,644 A | 7/2000 | Brandt et al. |
| 6,113,309 A | 9/2000 | Hollon et al. |
| 6,140,957 A | 10/2000 | Wilson et al. |
| 6,144,318 A | 11/2000 | Hayashi et al. |
| 6,191,732 B1 | 2/2001 | Carlson et al. |
| 6,287,048 B1 | 9/2001 | Hollon et al. |
| 6,371,566 B1 | 4/2002 | Haehn |
| 6,425,186 B1 | 7/2002 | Oliver |
| 6,481,924 B1 | 11/2002 | Smolders et al. |
| 6,655,465 B2 | 12/2003 | Carlson |
| 6,736,216 B2 | 5/2004 | Savard |
| 6,769,836 B2 | 8/2004 | Lloyd |
| 6,950,059 B2 | 9/2005 | Rapoport |
| 7,002,513 B2 | 2/2006 | Brabec |
| 7,363,154 B2 | 4/2008 | Lindores |
| 7,399,139 B2 | 7/2008 | Kieranen |
| 7,491,014 B2 | 2/2009 | Sick |
| 7,617,061 B2 | 11/2009 | Brabec |
| 7,643,923 B2 | 1/2010 | Buehlmann et al. |
| 7,946,787 B2 | 5/2011 | Glee et al. |
| 8,018,376 B2 | 9/2011 | McClure |
| 8,174,437 B2 | 5/2012 | Whitehead |
| 8,271,194 B2 | 9/2012 | Whitehead |
| 2004/0057795 A1 | 3/2004 | Mayfield et al. |
| 2004/0193348 A1 | 9/2004 | Gray et al. |
| 2008/0208417 A1 | 8/2008 | Buehlmann et al. |
| 2008/0253834 A1 | 10/2008 | Colvard |
| 2010/0023229 A1 | 1/2010 | Chiocco |
| 2011/0229264 A1 | 9/2011 | Weiser |
| 2012/0101725 A1 | 4/2012 | Kondekar |

FOREIGN PATENT DOCUMENTS

| | | |
|---|---|---|
| DE | 29918748 U1 | 2/2000 |
| DE | 69131837 T2 | 6/2000 |
| EP | 1103659 A2 | 5/2001 |
| EP | 1118713 A1 | 7/2001 |
| EP | 2119832 A1 | 11/2009 |
| WO | 9203701 A1 | 3/1992 |
| WO | 9516228 A1 | 6/1995 |

SELF-PROPELLED CIVIL ENGINEERING MACHINE AND METHOD OF CONTROLLING A SELF-PROPELLED CIVIL ENGINEERING MACHINE

The invention relates to a self-propelled civil engineering machine, and in particular a road milling machine, road paver or slipform paver, and to a method of controlling a self-propelled civil engineering machine and in particular a road milling machine, road paver or slipform paver.

There are a variety of known kinds of self-propelled civil engineering machines. In particular, these machines include the known slipform pavers, road pavers and road milling machines. The characteristic feature of these self-propelled civil engineering machines is that they have a working unit having working means for producing structures on the ground or for making changes to the ground.

In the known slipform pavers, the working unit comprises an arrangement for moulding flowable material and in particular concrete, which arrangement will be referred to in what follows as a concrete mould. Structures of different types, such as crash barriers and road gutters, can be produced with the concrete mould. A slipform paver is described EP 1 103 659 B1 (U.S. Pat. No. 6,481,924) for example.

The known road pavers generally have a screed as their working unit. The screed is so arranged, at that end of the road paver which is at the rear looking in the direction of paving, that it is supported by a lower sliding plate on the material of the road covering being laid and a pre-compression of the material thus takes place.

The working unit of the known road milling machines is a milling arrangement which has a milling drum fitted with milling tools, by which milling drum material can be milled off the ground over a preset working width.

The known self-propelled civil engineering machines also have a drive unit which has drive means to allow movements in translation and/or rotation to be performed, and a control unit for controlling the drive unit in such a way that the civil engineering machine performs movements in translation and/or rotation on the ground.

When self-propelled civil engineering machines are controlled automatically, the problem arises that a preset reference point on the civil engineering machine has to move precisely along a preset curve in space on the ground, in order for example to enable a structure of a preset shape to be produced on the ground in the correct position and in the correct orientation.

A known method of controlling slipform pavers presupposes the use of a guiding wire or line which lays down the desired curve along which the reference point on the civil engineering machine is to move. Elongated objects, such as crash barriers or road gutters for example, can be produced effectively by using a guiding wire or line. However, the use of a guiding wire or line is found to be a disadvantage when structures of small dimensions, such as cigar-shaped traffic islands for example, which are distinguished by extending for small distances and having tight radiuses, are to be produced.

It is also known for self-propelled civil engineering machines to be controlled by using a satellite-based global positioning system (GPS). A civil engineering machine having a GPS receiver is known from U.S. Pat. No. 5,612,864 for example.

It is a disadvantage that the plotting of the position of an object using a master measurement system to control the civil engineering machine calls for a great deal of technical cost and complication because the construction project will be complex and the object has to be fitted into it. What is particularly costly and complicated is the plotting which has to be done of the positions of various reference points in the measurement system. This cost and complication can only be justified for large objects. For small objects on the other hand the cost and complication is disproportionately high.

Another disadvantage of the objects being fitted into the complex building project lies in the fact that in practice, with small objects, allowance often has to be made for fixed points, such for example as existing hydrants or water outlets on the site, which may possibly not be situated precisely at the points at which they were entered in the plans. Should the project data not agree with the actual local facts, the project data has to be amended off the site in the office at relatively high cost and the amended project data then has to be read in again on the site.

The object underlying the invention is therefore to provide a self-propelled civil engineering machine, and in particular a road milling machine, a road paver or a slipform paver, which can move automatically, without any great cost or complication in the plotting of position and with high accuracy, along a desired curve extending for relatively short distances of travel and having tight radiuses. Another object is to specify a method which allows a self-propelled civil engineering machine to be controlled automatically, without any great cost or complication in the plotting of position and with high accuracy, along a desired curve extending for relatively short distances of travel and having tight radiuses.

The self-propelled civil engineering machine according to the invention has a control unit which has means for presetting a given geometrical shape for the structure to be produced or the ground to which changes are to be made. This given shape may for example be a traffic island in the shape of a cigar. It may be entered or selected by the operator of the machine.

The control unit of the self-propelled civil engineering machine according to the invention also has means for determining data which defines the position and/or orientation of a reference point on the civil engineering machine in relation to a reference system which is independent of the position and orientation of the civil engineering machine. The reference system independent of the machine-related reference system can be selected as desired, and there is thus no need for the positions of various reference points to be plotted on the ground.

The operation of the control system according to the invention of the civil engineering machine is based on the civil engineering machine being moved to a preset starting point on the ground which can be freely selected. At the preset starting point the civil engineering machine is aligned in a preset orientation. The position and orientation of the object are thus laid down. Consequently, the object can always be optimally positioned on the ground with due allowance made for any possible fixed points. The starting point may for example be sited at the corner of a gutter already present on the ground whose position need not exactly correspond to the layout plan.

As well as this, the control unit of the civil engineering machine also has means for determining data defining a desired curve, the desired curve being the curve along which the reference point (R) on the civil engineering machine is to move in the reference system (X, Y, Z) independent of the position and orientation of the civil engineering machine. The means for determining data defining the desired curve are so designed that the data defining the desired curve is determined on the basis of the preset geometrical shape of the structure to be produced or the ground to which changes are to be made and on the basis of the position and orientation of the reference point (R) on the civil engineering machine in the reference system (X, Y, Z) independent of the position and orientation of the civil engineering machine.

The data which defines the desired curve may be the distance covered by the desired curve and/or its curvature. This data is dependent on the shape of the object.

In a preferred embodiment, the means for controlling the drive unit are so designed that the drive unit is so controlled, as a function of the position and orientation of the reference point in the reference system independent of the position and orientation of the civil engineering machine, that the distance between the desired position of the civil engineering machine, as defined by the desired curve, and its actual position, and/or the difference in direction between the desired direction, as defined by the desired curve, and the actual direction, is minimal. The control algorithms required for this purpose are well known to the person skilled in the art.

An embodiment of the invention which is a particular preference makes provision for use to be made of a satellite-based global positioning system (GPS) to determine the position and/or orientation of the reference point on the civil engineering machine. The reference system independent of the position and orientation of the civil engineering machine is thus the reference system of the satellite-based global positioning system, whose position and direction relative to the machine-related reference system constantly change as the civil engineering machine moves over the ground. The civil engineering machine has a first and a second DGPS receiver (rover) for decoding the GPS satellite signals from the satellite-based global positioning system and correcting signals from a reference station for determining the position and/or orientation of the civil engineering machine, the first and second DGPS receivers being arranged in different positions on the civil engineering machine.

However, rather than by means of a satellite-based global positioning system, the position and/or orientation of the reference point may also be determined with a non-satellite measurement system. The only thing that is crucial is for the control unit to receive data defining the position and orientation of the reference point.

In a further preferred embodiment, the control unit has an input unit having means (7B) for the input of parameters which define the geometrical shape of the structure to be produced or the ground to which changes are to be made. These parameters may for example be parameters which define the length of a straight line and/or the radius of an arc of a circle. It is assumed in this case that the object can be broken down into straight lines and arcs. This can be done for example in the case of a traffic island in the shape of a cigar. However, it is also possible for other geometrical figures to be defined by the parameters.

In a further preferred embodiment, the control unit has an input unit having means for selecting one geometrical shape from a plurality of preset geometrical shapes, the plurality of geometrical shapes being stored in a storage unit which co-operates with the input unit. The advantage of this is that the data defining the geometrical shape does not have to be created afresh and instead recourse may be had to data sets which have already been created. A choice may for example be made between a circle and a cigar shape as an object.

A further embodiment which is a particular preference makes provision for means for modifying a preset geometrical shape. The advantage that this has is that the shape of a cigar for example may be selected and the dimensions of the cigar can then be adjusted to suit the actual requirements on the site.

Embodiments of the invention will be explained in detail in what follows by reference to the drawings.

Figure 1:
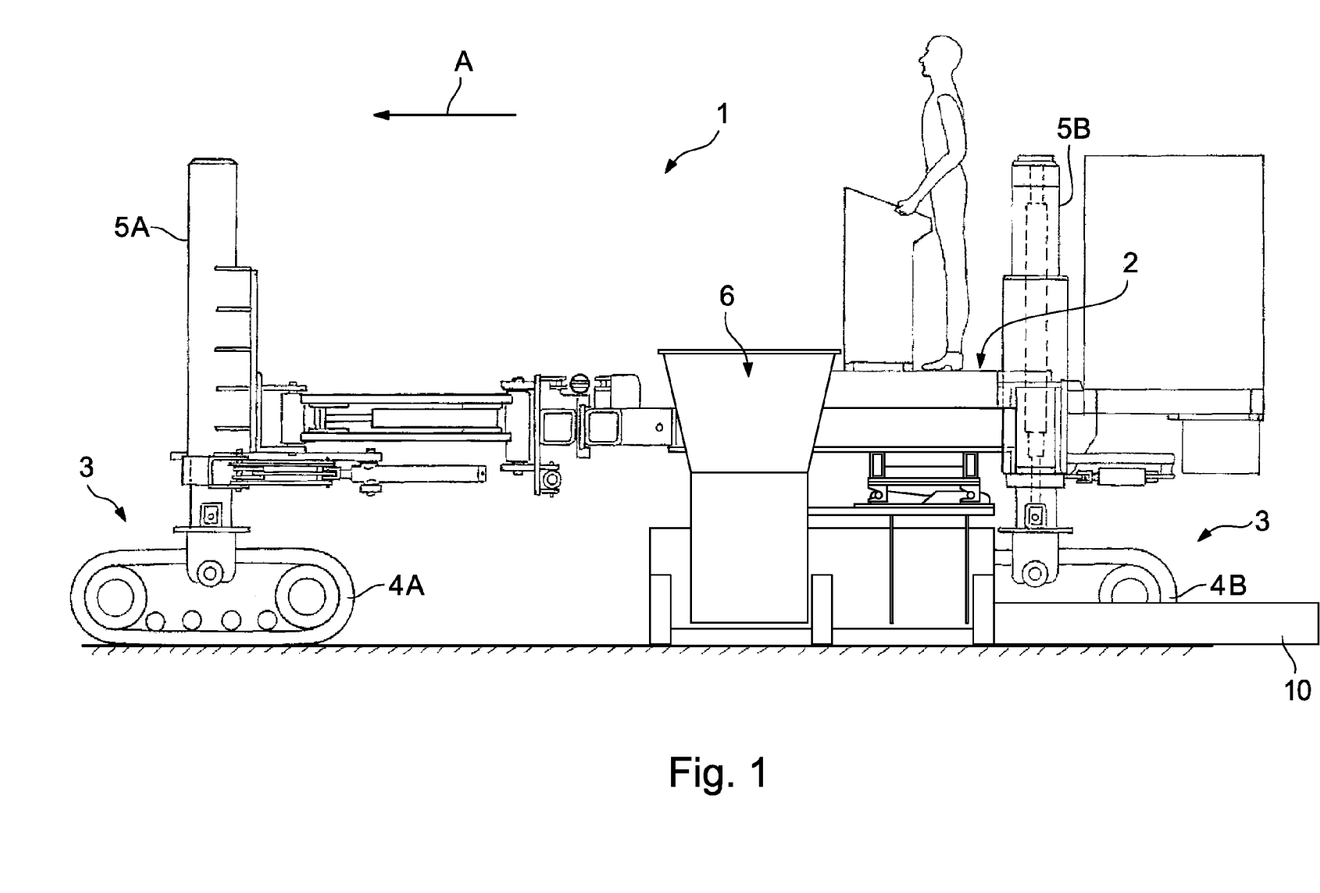
FIG. 1 is a side view of an embodiment of slipform paver.

FIG. 1 is a side view of, as an example of a self-propelled civil engineering machine, a slipform paver which is described in detail in EP 1 103 659 B1 (U.S. Pat. No. 6,481,924). Because slipform pavers as such are part of the prior art, all that will be described here are those components of the civil engineering machine which are material to the invention.

The slipform paver 1 has a chassis 2 which is carried by running gear 3. The running gear 3 has two front and two rear track-laying running gear units 4A, 4B which are fastened to front and rear lifting pillars 5A, 5B. The direction of working (direction of travel) of the slipform paver is identified by an arrow A.

The track-laying running gear units 4A, 4B and the lifting pillars 5A, 5B are parts of a drive unit of the slipform paver which has drive means to allow the civil engineering machine to carry out movements in translation and/or rotation on the ground. By raising and lowering the lifting pillars 5A, 5B, the chassis 2 of the machine can be moved relative to the ground to adjust its height and inclination. The civil engineering machine can be moved backwards and forwards by the track-laying running gear units 4A, 4B. The civil engineering machine thus has three degrees of freedom in translation and three degrees of freedom in rotation.

The slipform paver 1 has an arrangement 6, which is only indicated, for moulding concrete which will be referred to in what follows as a concrete mould. The concrete mould is part of a working unit which has working means for producing a structure 10 of a preset shape on the ground.

Figure 2:
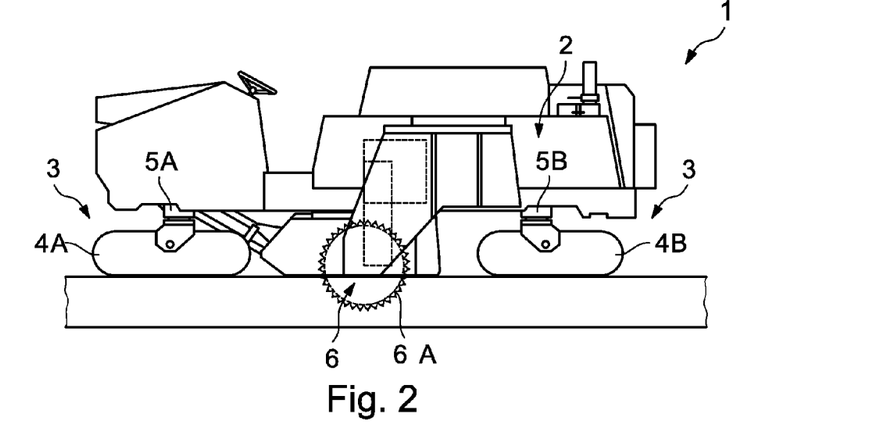
FIG. 2 is a side view of an embodiment of road milling machine.

FIG. 2 is a side view of, as a further example of a self-propelled civil engineering machine, a road milling machine. Once again, the road milling machine 1 too has a chassis 2 which is carried by running gear 3. The running gear 3 has two front and two rear track-laying running gear units 4A, 4B which are fastened to front and rear lifting pillars 5A, 5B. The road milling machine has a working unit which has working means to make changes to the ground. This working unit is a milling arrangement 6 which has a milling drum 6A fitted with milling tools.

Figure 3:
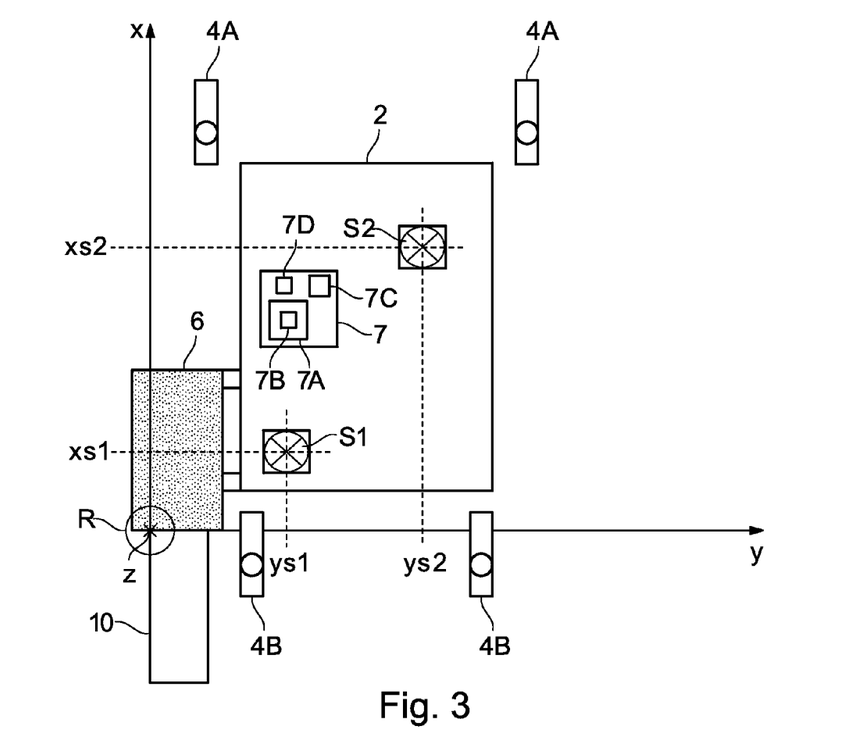
FIG. 3 shows a machine co-ordinate system related to a civil engineering machine together with the civil engineering machine, which is merely indicated.

FIG. 3 shows the self-propelled civil engineering machine in a machine-related Cartesian co-ordinate system (x, y, z). The civil engineering machine may be a slipform paver, a road milling machine or any other civil engineering machine which has an appropriate working unit. The present embodiment is a slipform paver 1 which has a concrete mould 6. The slipform paver 1 and the concrete mould 6 are merely indicated. It has the chassis 2, having the track-laying running gear units 4A, 4B, and the concrete mould 6.

The origin of the machine co-ordinate system is at a reference point R on the slipform paver 1, what is laid down as the reference point R being that edge of the concrete mould 6 which is on the inside and at the rear in the direction of travel. This edge corresponds to the outer boundary of the structure 10 to be produced. In the machine co-ordinate system, the reference point R is determined as follows:

$$R = xR, yR, zR = 0,0,0$$

The machine co-ordinate system is clearly defined by six degrees of freedom, with the lengths of travel dx, dy, dz defining the movements in translation and the angles $\omega$, $\phi$, $\kappa$ defining the three movements in rotation.

To simplify things, it will be assumed that the civil engineering machine is standing on flat ground and is not inclined. The angles $\omega$ and $\kappa$ in rotation are thus each equal to zero. The machine co-ordinate system and the civil engineering machine are aligned to one another in such a way that the angle $\phi$ in rotation is equal to zero as well.

It will also be assumed that the bottom edge of the concrete mould 6 is resting on the ground. This lays it down that the height zR of the reference point R is not to change as the civil engineering machine moves over the flat ground.

Figure 4:
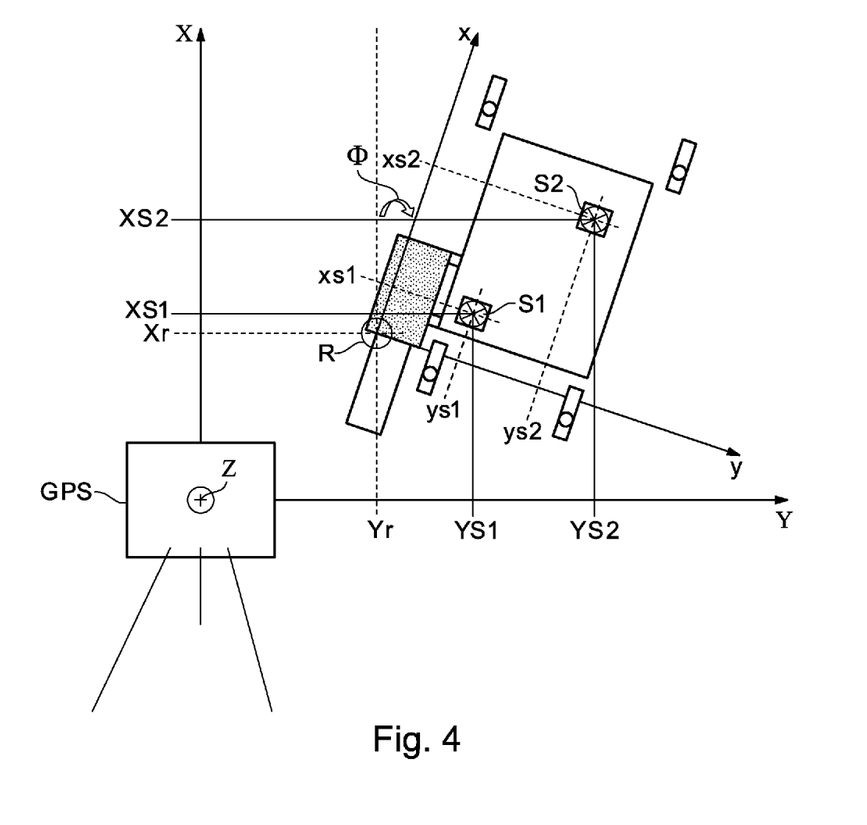
FIG. 4 shows a measurement co-ordinate system independent of the position and orientation of the civil engineering machine together with the machine co-ordinate system and civil engineering machine which are shown in FIG. 3.

FIG. 4 shows the machine co-ordinate system together with a Cartesian reference system, independent of the machine co-ordinate system (x, y, z), which will be referred to in what follows as the measurement co-ordinate system (X, Y, Z). The measurement co-ordinate system (X, Y, Z) may be selected at random. It remains in the same position and orientation as the civil engineering machine moves.

To control the drive unit, the civil engineering machine has a control unit 7 which is merely indicated. The control unit 7 controls the drive means of the drive unit in such a way that the civil engineering machine performs the requisite movements in translation and/or rotation on the ground to enable it to produce the structure 10 or make changes to the ground. The control unit 7 comprises all the components which are required to perform calculating operations and to generate control signals for the drive means of the drive unit. It may form a self-contained unit or it may be part of the central control system of the civil engineering machine.

To allow the drive unit to be controlled, the position and/or orientation of the reference point R of the civil engineering machine in the machine co-ordinate system (x, y, z) is transposed into the measurement co-ordinate system (X, Y, Z) independent of the movements of the civil engineering machine.

In the present embodiment, the position and orientation of the reference point R are determined using a satellite-based global positioning system (GPS), which is only indicated in FIG. 4. However, rather than a satellite-based positioning system what may also be used is a non-satellite terrestrial measuring system (a total station). Because the requirements for the accuracy with which position and orientation are determined are stringent ones, what is preferably used is that satellite-based global positioning system which is known as the differential global positioning system (DGPS). The GPS-based method of determining orientation is based in this case on the measurement of position by two DGPS receivers (rovers) which are arranged at different points S1, S2 on the civil engineering machine.

The two DPGS receivers S1 and S2 are merely indicated in FIGS. 3 and 4. The case assumed is the more general one where the DGPS receiver S1 and the DGPS receiver S2 are situated near the origin of the machine co-ordinate system in which the reference point R is sited, the position and orientation of which reference point R are determined in the measurement co-ordinate system.

The positions of the DGPS receivers S1 and S2 are determined in the machine co-ordinate system (x, y, z) by the co-ordinates S1=xs1, ys1, zs1 and S2=xs2, ys2, zs2. In the measurement co-ordinate system (X, Y, Z), the positions of the DGPS receivers S1 and S2 are determined by S1=XS1, Y-S1, ZS1 and S2=XS2, YS2, ZS2.

By using the two DGPS receivers S1 and S2, the control unit 7 employs the GPS system to determine data which defines the position of the DGPS receivers. From this data on position, the control unit 7 then calculates the position and orientation of the reference point R on the civil engineering machine near to which the two DGPS receivers are situated. For this purpose, the control unit 7 performs a transformation with the rotation matrix R to transform the co-ordinates at the points S1 and S2 which were measured in the measurement co-ordinate system (X, Y, Z) by the DGPS receivers S1 and S2 to give the reference point R $$\begin{bmatrix} \Delta X \\ \Delta Y \\ \Delta Z \end{bmatrix} = \begin{bmatrix} XS1 - xs1 \\ YS1 - ys1 \\ ZS1 - zs1 \end{bmatrix}$$

$$\begin{bmatrix} X \\ Y \\ Z \end{bmatrix} = [R] \begin{bmatrix} x \\ y \\ z \end{bmatrix} + \begin{bmatrix} \Delta X \\ \Delta Y \\ \Delta Z \end{bmatrix}$$

$$\begin{bmatrix} X \\ Y \\ Z \end{bmatrix} = \begin{bmatrix} \cos\phi & -\sin\phi & 0 \\ \sin\phi & \cos\phi & 0 \\ 0 & 0 & 1 \end{bmatrix} \begin{bmatrix} x \\ y \\ z \end{bmatrix} + \begin{bmatrix} \Delta X \\ \Delta Y \\ \Delta Z \end{bmatrix}$$

The result is that the control unit determines the measurement co-ordinates of the reference point R on the concrete mould 6 of the slipform paver 1 in the measurement co-ordinate system (X, Y, Z):

$$R = \begin{bmatrix} Xr \\ Yr \\ Zr \end{bmatrix}$$

The control unit uses the following equation to calculate the angle $\phi$ giving the direction of the civil engineering machine from the co-ordinates (XS2, XS1; YS2, YS1) of the measured points S1 and S2:

$$\Phi = \arctan(XS2 - XS1/YS2 - YS1)$$

The control unit 7 controls the drive unit of the civil engineering machine in such a way that the civil engineering machine moves along a preset desired curve, i.e. the reference point R on the civil engineering machine moves along the desired curve.

In its general form, the desired curve can be defined as follows as a function of distance travelled and curvature:

$$\begin{bmatrix} X \\ Y \end{bmatrix} = f(L) = \int \begin{matrix} \cos\alpha \\ \sin\alpha \end{matrix} (dl) = \begin{bmatrix} X0 \\ Y0 \end{bmatrix}$$

where $$\alpha = \int K(dl).$$

The curvature K is defined by K=1/R.

In the present embodiment, the slipform paver is to produce a traffic island in the shape of a "cigar". The geometrical shape of the cigar is defined by a curve which comprises two parallel distances travelled and two arcs of a circle. What will be described in what follows will be only that part of the curve which comprises the initial straight line and the first semi-circular arc.

In the embodiment of the cigar, the curvature on the initial straight line is equal to zero. When the reference point R on the civil engineering machine moves along the first arc of a circle, the curvature is constant. Once the civil engineering machine has ceased to move along the arc, the curvature once again becomes zero.

Figure 5:
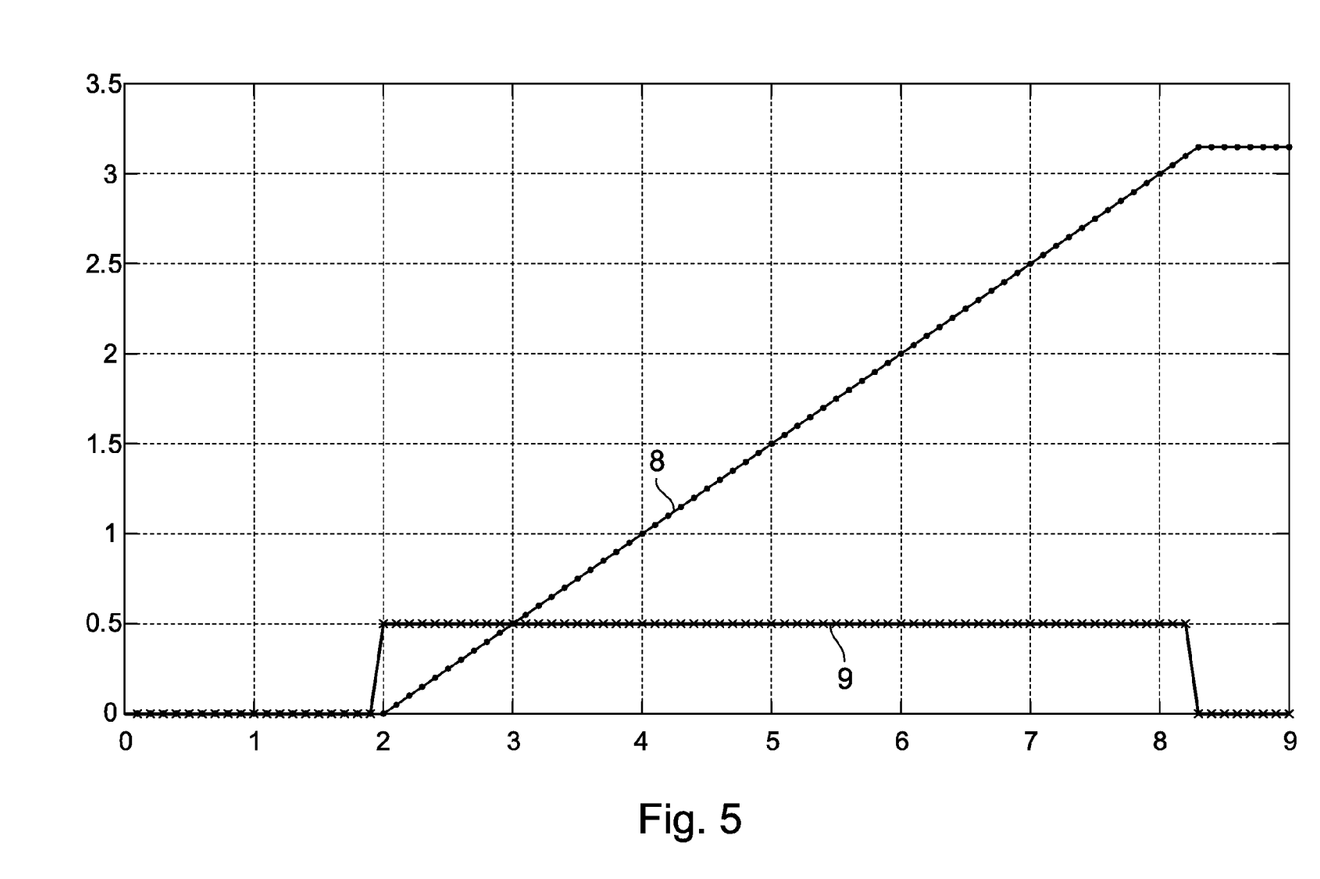
FIG. 5 shows the graph curves for curvature and direction for an object in the shape of a cigar.

FIG. 5 shows the graph plot 9 for curvature and the graph plot 8 for direction for the slipform paver when producing a cigar whose geometrical shape is defined by a straight line of a length of 2 m and by a semi-circular arc whose radius is 2 m. The length and radius constitute in this case two parameters by which the geometrical shape of the cigar is preset. It will be clear that the graph plot for direction changes as the civil engineering machine enters the arc.

Figure 6:
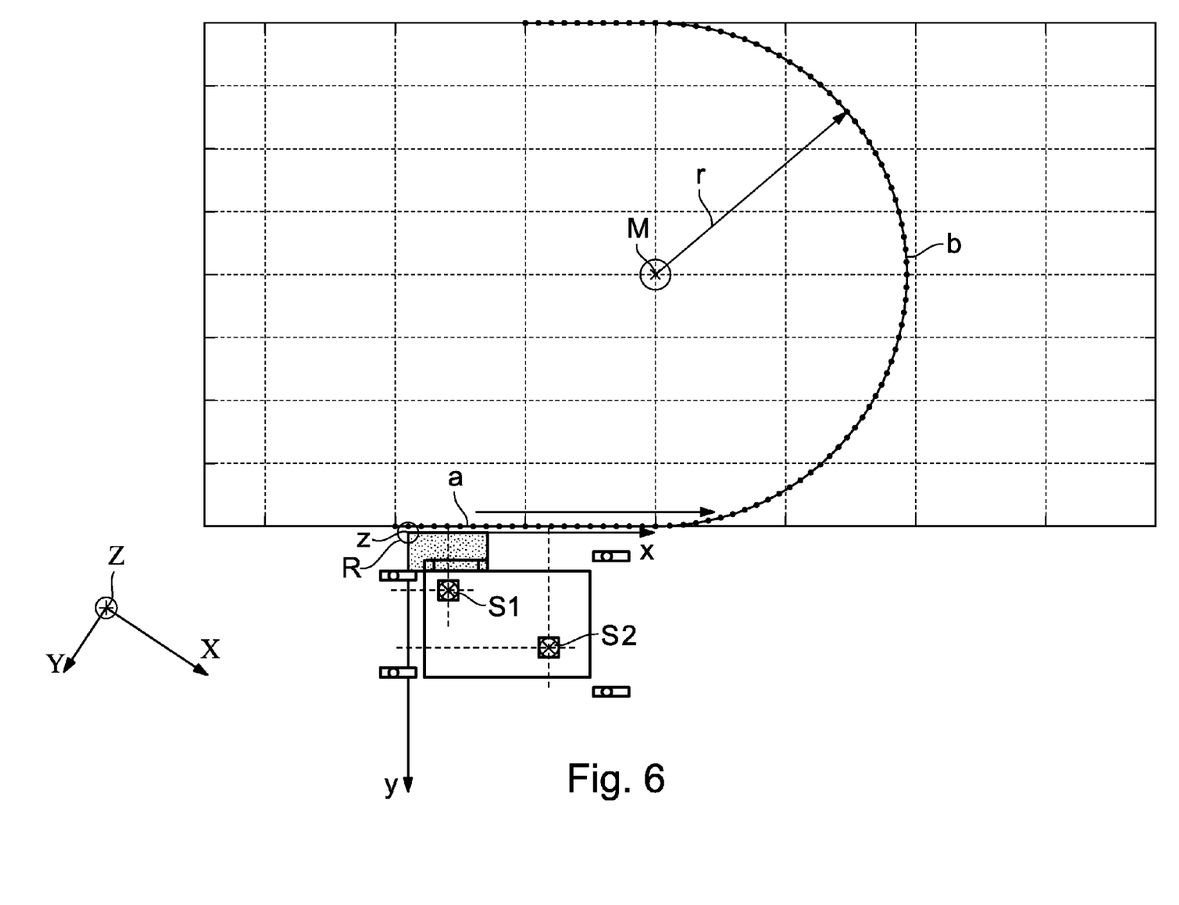
FIG. 6 is a view of the geometrical shape defining a cigar-shaped object for controlling the civil engineering machine, before it is transposed into the measurement co-ordinate system.

The operator of the civil engineering machine first presets a given geometrical shape such as the shape of a cigar for example. The operator is free as to the geometrical shape he presets. FIG. 6 shows the geometrical shape which is defined by a straight line "a" and a semi-circular arc "b". Simply to make things clear, the geometrical shape of the cigar has been shown in a grid which relates to the machine co-ordinate system. The measurement co-ordinate system (X, Y, Z) has therefore been indicated in FIG. 6 only to show the relationship between the machine and measurement co-ordinate systems.

The control system according to the invention relies on a starting point at which the production of the structure 10, such as a cigar for example, begins first being freely selected for the slipform paver on the ground. This starting point corresponds to the origin of the machine co-ordinate system, i.e. the reference point R (FIG. 6). The starting point may for example be situated next to a fixed point which is preset on the ground, such as a water inlet for example. The starting point defines the place at which the structure 10, such as the cigar for example, is to be produced. The orientation of the civil engineering machine is preset freely at the starting point, thus laying down the direction in which the structure 10, such as the cigar for example, is to extend.

The civil engineering machine is now driven to the selected starting point and is aligned in the preset orientation. This process is not automated. The automated control of the civil engineering machine then takes place.

The civil engineering machine having been positioned and aligned, the control unit 7 determines for the starting point the data which defines the position and orientation of the reference point R in the measurement co-ordinate system (X,Y,Z). This data which defines the position and orientation of the reference point R may be referred to as position data. For the subsequent control, the preset geometrical shape, such as the cigar for example, then has to be transposed to the measurement co-ordinate system (X, Y, Z). On the basis of the preset geometrical shape of the structure to be produced or of the ground to which changes are to be made and on the basis of the position and orientation of the reference point R on the civil engineering machine in the measurement co-ordinate system (X, Y, Z) which is independent of the position and orientation of the civil engineering machine, the control unit 7 determines data which defines a desired curve, the desired curve being that curve along which the reference point R on the civil engineering machine is to move in the measurement co-ordinate system (X, Y, Z). The data defining the desired curve may be referred to as curve data.

Figure 7:
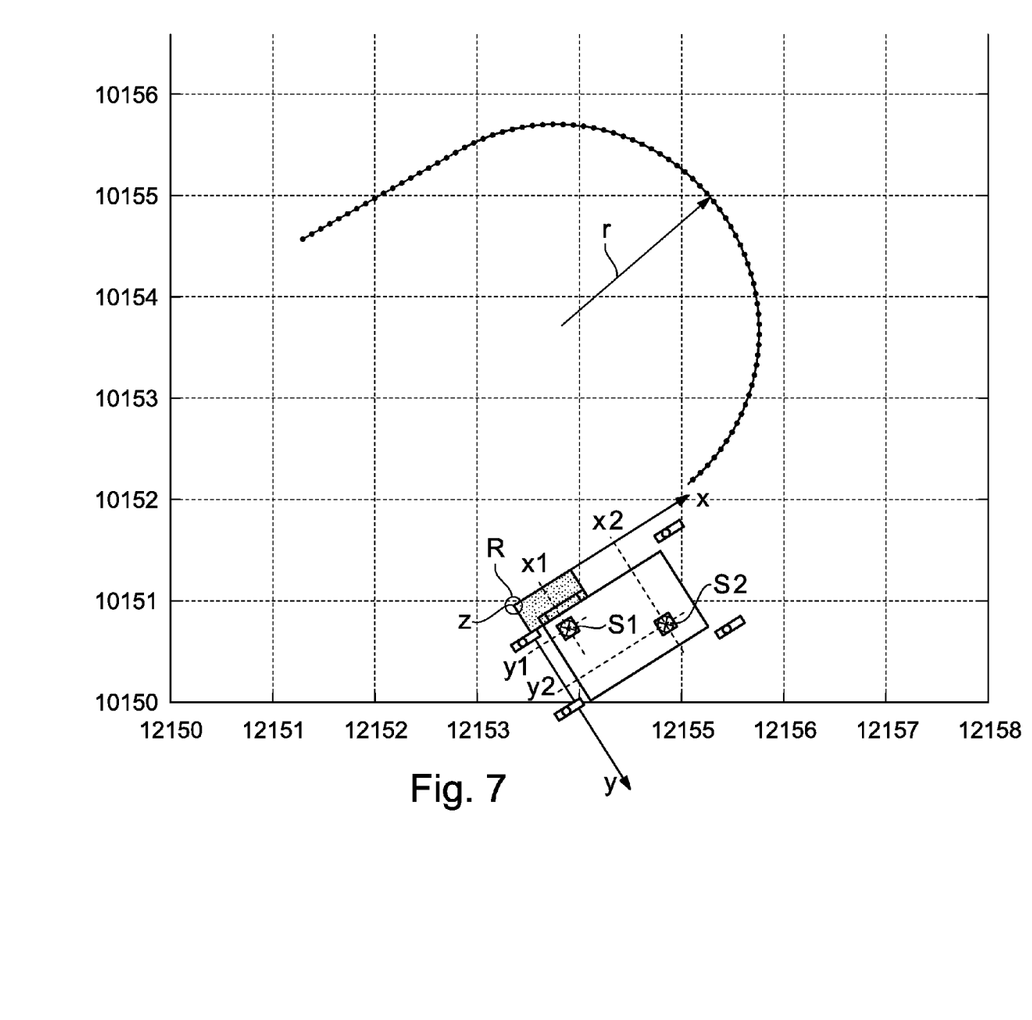
FIG. 7 is a view of the desired curve defining a cigar-shaped object for controlling the civil engineering machine, after it has been transposed into the measurement co-ordinate system.

FIGS. 6 and 7 show the transfer of the freely preset geometrical shape (FIG. 6) to the measurement co-ordinate system (X,Y,Z) (FIG. 7), to allow the desired curve which defines the desired positions of the reference point in the measurement co-ordinate system (X, Y, Z) to be laid down.

The position and orientation of the reference point R on the civil engineering machine at the starting point having been determined and the desired curve having been laid down, the control unit 7 puts the civil engineering machine into operation. The control unit now determines, continuously or at discrete increments of time, the actual position (Xr, Yr) and actual direction (φ) of the reference point R on the civil engineering machine in the measurement co-ordinate system (X, Y, Z). In so doing the control unit each time calculates the distance D between the desired position P and the actual position (Xr, Yr) and the difference in direction Δφ between the desired direction α and the actual direction φ.

Using a preset control algorithm, a drive control component of the control unit 7 calculates from the distance D and the difference in direction Δφ the value at the time of the manipulated variable for the drive means of the drive unit in such a way that the distance D and the difference in direction Δφ are minimal, i.e. in such a way that the reference point on the civil engineering machine moves along the desired curve. Control algorithms of this kind are well known to the person skilled in the art.

Figure 8:
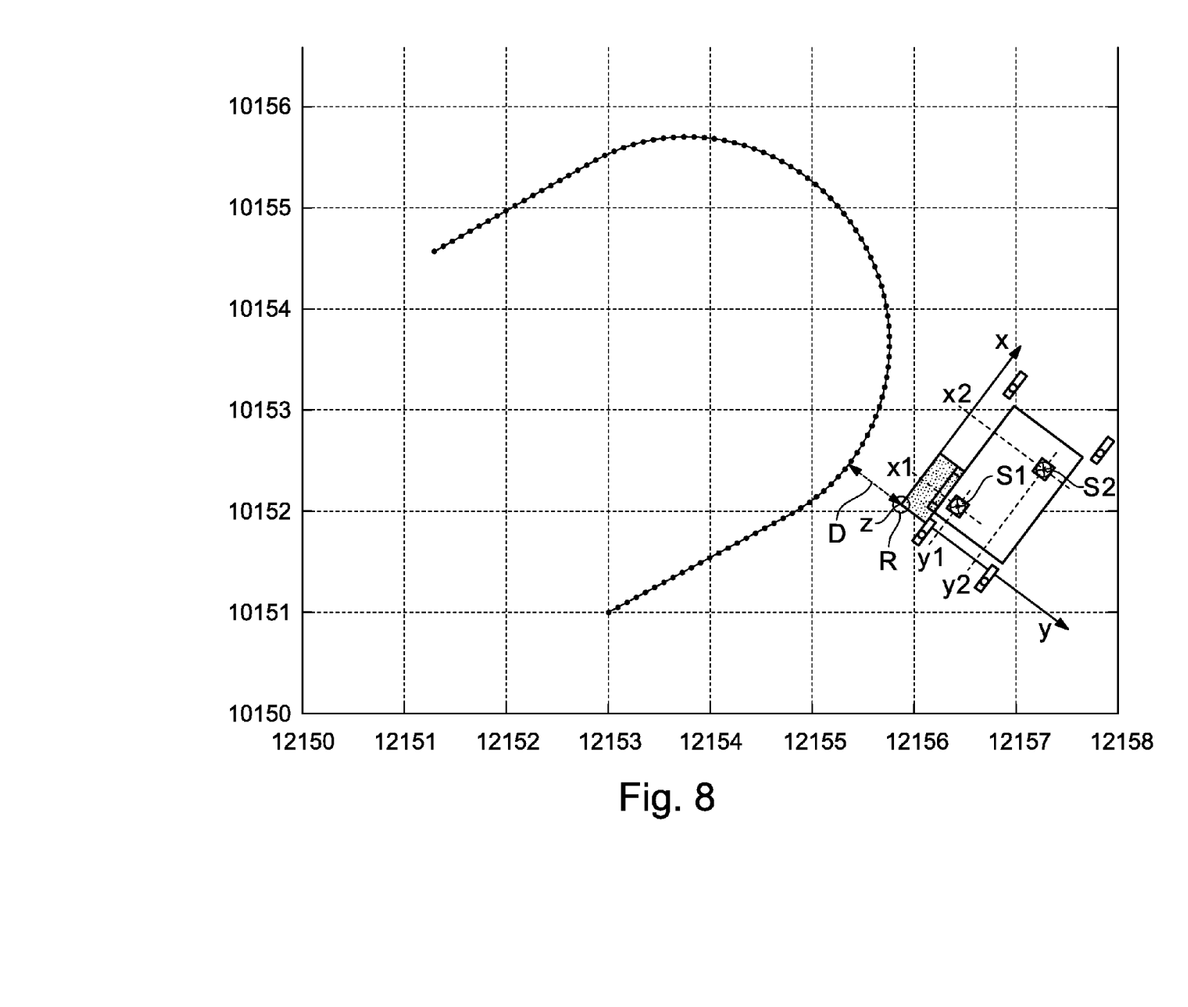
FIG. 8 shows the distance between the desired position of the civil engineering machine as defined by the desired curve and its actual position.
Figure 9:
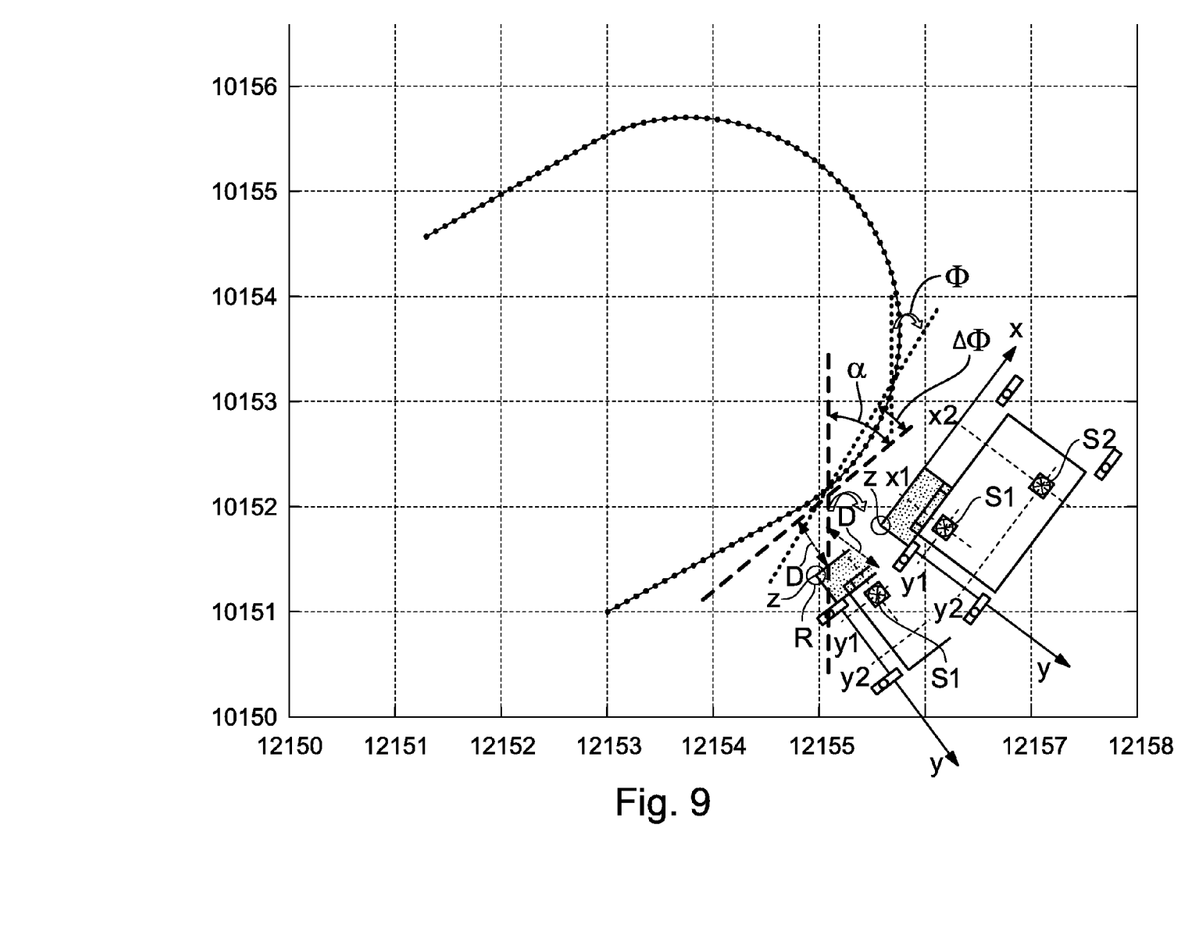
FIG. 9 shows the difference in direction between the desired direction of the civil engineering machine as defined by the desired curve and its actual direction.

FIG. 8 shows the distance D between the desired position of a point on the desired curve and the actual position (Xr,Yr) of the reference point R, while FIG. 9 shows the difference in direction Δφ between the desired direction α and the actual direction φ at a point on the desired curve. The correction to the steering is found as a function of the distance D and the difference in direction Δφ (correction to steering=f (D, Δφ).

For the presetting of the geometrical shape, i.e. for the presetting of a given object, the control unit has an input unit 7A which is once again merely indicated. The input unit 7A may also be referred to as a shape selection component 7A. In one embodiment, the input unit 7A has means 7B in the form of, for example, a keyboard or a touch screen. From the keyboard or touch screen 7B, the operator of the machine can enter various parameters which define the geometrical shape. The operator may for example enter the length of the straight line and the radius of the arc for a cigar. The input unit 7A may also have means 7B, such for example as a keyboard or touch screen once again, to enable one geometrical shape which defines the desired object to be selected from a plurality of geometrical shapes which are stored in a memory unit 7C of the control unit. As well as for the input of parameters and/or the selection of geometrical shapes, a further embodiment of the control unit 7 also makes provision for the modification of a geometrical shape which has been entered or selected. For example, a cigar whose straight lines are of a preset length and whose arcs are of a preset radius may be selected and then, by entering new parameters for the length of the straight lines and/or the radius of the arcs from the keyboard or touch screen 7B, the cigar which was selected may be adjusted to suit the particular requirements which exist at the site, the cigar being made smaller or larger for example and in particular its width or length being changed.

As well as this, the input unit 7A also has means 7D, in the form of a switch or push-button 7D for example, by which the civil engineering machine can be put into operation on the ground after the positioning and alignment. A switch or push-button 7D may also be provided on the input unit 7A to enable the civil engineering machine to be stopped before it has moved for the entire length of the desired curve. The civil engineering machine having been stopped, new parameters may, for example, then be entered from the keyboard or touch screen 7B to change the path followed by the curve and for example to change the height of the object being produced.

What is claimed is:

1. A method of controlling a self-propelled civil engineering machine for movement in a reference system fixed relative to a ground surface, the machine including a working unit configured to produce a structure on the ground surface or to make changes to the ground surface, the method comprising:
    (a) defining a defined shape independent from the reference system fixed relative to the ground surface;
    (b) defining a desired position and orientation of the defined shape in the reference system fixed relative to the ground surface;
    (c) determining on the basis of the defined shape and the desired position and orientation of the defined shape, path data in the reference system fixed relative to the ground surface;
    (d) determining of data which defines a position and orientation of the civil engineering machine in relation to the reference system fixed relative to the ground surface; and
    (e) controlling of the civil engineering machine as a function of the path data, in such a way that the working unit produces the structure or makes the changes to the ground surface according to the defined shape and in the desired position and orientation in the reference system fixed relative to the ground surface.

2. The method of claim 1, the machine being a road-milling machine, and wherein the working unit is a milling drum.

3. The method of claim 1, the machine being a slipform paver, and wherein the working unit is a concrete mold.

4. The method of claim 1, the machine being a road paver machine, and wherein the working unit is a screed for shaping material.

5. The method of claim 1, wherein:
    in step (c) the path data includes a current position of the civil engineering machine in the reference system fixed relative to the ground surface, as a starting point for the path data.

6. The method of claim 1, wherein step (a) comprises inputting parameters defining the defined shape.

7. The method of claim 1, wherein step (a) comprises selecting one defined shape from a plurality of defined shapes.

8. The method of claim 1, wherein the path data defines a distance travelled along a desired path and/or its curvature.

9. The method of claim 1, wherein the reference system fixed relative to the ground surface is selected at random.

10. The method of claim 1, wherein step (d) is performed continuously.

11. The method of claim 1, wherein step (d) is performed in discrete increments.

12. A control system configured to control the movements of a civil engineering machine on a ground surface, the control system being configured to control the civil engineering machine as a function of path data defining a desired path of the civil engineering machine, the path data being determined on the basis of a defined shape defined independent of a reference system fixed relative to the ground surface and on the basis of a desired position and orientation of the defined shape in the reference system fixed relative to the ground surface, such that the civil engineering machine moves along the desired path such that a working unit of the civil engineering machine produces the structure or makes the changes to the ground surface according to the defined shape and in the desired position and orientation in the reference system fixed relative to the ground surface.

13. The control system of claim 12, wherein:
    the desired position and orientation of the defined shape in the reference system fixed relative to the ground surface is based on a current position and orientation of the civil engineering machine relative to the reference system fixed relative to the ground surface.

14. The control system of claim 12, wherein:
    the path data defines a distance travelled along the desired path and/or a curvature of the desired path.

15. The control system of claim 12, wherein the control system is configured to control the drive unit, as a function of the position and/or orientation of the civil engineering machine relative to the reference system fixed relative to the ground surface, such that the distance between a desired position of the civil engineering machine, as defined by the desired path, and an actual position of the civil engineering machine, and/or a difference in direction between a desired direction of the civil engineering machine defined by the desired path and an actual direction of the civil engineering machine, is minimal.

16. The control system of claim 12, further including at least one DGPS receiver for decoding GPS satellite signals from a satellite-based global positioning system and correcting signals from a reference station.

17. The control system of claim 16, wherein the control system is configured to determine the orientation of the civil engineering machine as a function of the data from the at least one DGPS receiver, an alignment of a steerable drive track or wheel of the civil engineering machine and a distance driven by the civil engineering machine.

18. The control system of claim 12, further including at least one terrestrial measuring system.

19. The control system of claim 12, further including a first and second DGPS receiver for decoding GPS satellite signals from a satellite-based global positioning system and correcting signals from a reference station for determining the position and orientation of the civil engineering machine, the first and second DGPS receivers being arranged in different positions on the civil engineering machine.

20. The control system of claim 12, further including a first and second receiver belonging to a non-satellite measuring system for determining the position and orientation of the civil engineering machine, the first and second receivers being arranged in different positions on the civil engineering machine.

21. The control system of claim 12, further including an input unit operable for the input of parameters to define the defined shape.

22. The control system of claim 21, wherein the parameters are parameters which define the length of a straight line and/or the radius of an arc of a circle.

23. The control system of claim 12, further including an input unit operable to select one defined shape from a plurality of pre-defined shapes.

24. The control system of claim 23, further including a storage unit which co-operates with the input unit and in which the plurality of pre-defined shapes are stored.

25. The control system of claim 23, wherein the input unit is operable to modify a pre-defined shape.

26. The control system of claim 12, wherein the control system is operable to start the movement of the civil engineering machine at a preset starting point on the ground surface at which the civil engineering machine is in a preset position and orientation.

27. The control system of claim 12, wherein the control system is operable to stop the movement of the civil engineering machine along the desired path.

28. The control system of claim 12, wherein the civil engineering machine is a road milling machine, the working unit having a milling arrangement having a milling drum.

29. The control system of claim 12, wherein the civil engineering machine is a slipform paver, the working unit having an arrangement for molding flowable material.

30. The control system of claim 12, wherein the civil engineering machine is a road paver, the working unit having a screed for shaping material.

31. The control system of claim 12, wherein:

the control system is configured to control the drive unit to steer the civil engineering machine to a point on the desired path when the civil engineering machine is not located on the desired path.

32. The control system of claim 12, wherein:

the control system is completely contained in a control unit mounted on the civil engineering machine.

33. The control system of claim 12, wherein:

the control system is configured such that a position and orientation of the civil engineering machine in relation to the reference system fixed relative to the ground surface is determined continuously.

34. The control system of claim 12, wherein:

the control system is configured such that a position and orientation of the civil engineering machine in relation to the reference system fixed relative to the ground surface is determined in discrete increments.

\* \* \* \* \*

UNITED STATES PATENT AND TRADEMARK OFFICE
CERTIFICATE OF CORRECTION

PATENT NO. : 8,888,402 B2  Page 1 of 1
APPLICATION NO. : 14/087988
DATED : November 18, 2014
INVENTOR(S) : Fritz et al.

It is certified that error appears in the above-identified patent and that said Letters Patent is hereby corrected as shown below:

In the Specification

In column 6, line 17, replace "Y-S1" with --YS1--.

Signed and Sealed this
Twenty-fifth Day of August, 2015

Michelle K. Lee
*Director of the United States Patent and Trademark Office*